(12) United States Patent
Rutkowski et al.

(10) Patent No.: US 7,365,503 B2
(45) Date of Patent: Apr. 29, 2008

(54) HALL EFFECT SENSOR TEMPERATURE COMPENSATOR

(75) Inventors: David J. Rutkowski, Grosse Isle, MI (US); John H. Floros, Novi, MI (US); Imad Sharaa, Farmington, MI (US)

(73) Assignee: Ford Motor Company, Dearborn, MI (US)

( * ) Notice: Subject to any disclaimer, the term of this patent is extended or adjusted under 35 U.S.C. 154(b) by 429 days.

(21) Appl. No.: 11/148,648

(22) Filed: Jun. 9, 2005

(65) Prior Publication Data

US 2006/0279244 A1 Dec. 14, 2006

(51) Int. Cl.
*H02P 1/00* (2006.01)

(52) U.S. Cl. .................. 318/138; 318/439; 318/254; 318/700

(58) Field of Classification Search ............ 318/138, 318/254, 439, 700, 721
See application file for complete search history.

(56) References Cited

U.S. PATENT DOCUMENTS

| | | | |
|---|---|---|---|
| 4,634,961 A | 1/1987 | Popovic et al. | |
| 5,686,827 A * | 11/1997 | Ward | 323/368 |
| 5,710,493 A * | 1/1998 | Flynn | 318/254 |
| 6,351,116 B1 | 2/2002 | Bolda et al. | |
| 6,522,130 B1 | 2/2003 | Lutz | |
| 6,563,303 B1 | 5/2003 | Watkins | |
| 6,567,763 B1 | 5/2003 | Javanifard et al. | |
| 6,576,890 B2 | 6/2003 | Lin et al. | |
| 6,593,734 B1 | 7/2003 | Gandel et al. | |
| 6,693,421 B2 | 2/2004 | Wolf | |
| 6,693,422 B2 | 2/2004 | Lutz | |
| 6,707,293 B2 | 3/2004 | Wan et al. | |
| 2004/0046549 A1 | 3/2004 | Van Ostrand et al. | |
| 2004/0066187 A1 | 4/2004 | Schroter et al. | |
| 2004/0196028 A1 | 10/2004 | Schroeder et al. | |

\* cited by examiner

*Primary Examiner*—Rina Duda
(74) *Attorney, Agent, or Firm*—Gregory Brown; MacMillan, Sobanski and Todd, LLC

(57) ABSTRACT

A system and method for compensating the output of an uncompensated Hall Effect sensor used to monitor an output shaft of an actuator. The actuator includes an output shaft, a magnet coupled to the output shaft, a motor for rotating the output shaft between a first position and a second position and an electronic control module having a controller, a diode and an uncompensated Hall Effect sensor.

8 Claims, 1 Drawing Sheet

HALL EFFECT SENSOR TEMPERATURE COMPENSATOR

BACKGROUND

1. Field of the Invention

The present invention relates to electronically controlled actuators and more specifically to electronically controlled actuators having Hall Effect sensors.

2. Description of the Known Technology

Automobiles are equipped with electronically controlled actuators to open and close the doors of various passageways located throughout the automobile. These passageways may include heating, ventilation, air conditioning passageways, or air passageways to the intake manifolds of internal combustion engines. These actuators will open and close the door of a passageway by rotating an output shaft connected to the door. The actuator determines if the output shaft has rotated the door to a fully opened or to a fully closed position by monitoring the output of a Hall Effect sensor configured to monitor a magnetic field created by a magnet coupled to the output shaft. This magnetic field will vary with the position of the output shaft.

The magnetic field produced by the magnet may vary as the temperature of the magnet changes. To overcome this problem, Hall Effect sensors have been developed that compensate their output based on a change in temperature. Compensated Hall Effect sensors, however, are more costly than uncompensated Hall Effect sensors and are only used with Samarian cobalt ("SmCo") magnets, which are more costly than other types of common magnets, such as neodymium iron boron ("NeFeB") magnets.

Thus, there exists a need for a solution that compensates the output of an uncompensated Hall Effect sensor using either a NeFeB magnet or other type of common magnet.

BRIEF SUMMARY

In overcoming the drawbacks and limitations of the known technology, a system and method for calibrating an actuator having a motor connected to an output shaft is disclosed. The actuator includes an output shaft, a NeFeB or other common magnet coupled to the output shaft, a motor for rotating the output shaft, and an electronic control module having a controller and a sensor. Preferably, the sensor is an uncompensated Hall Effect sensor. The sensor is configured to provide an output signal to the controller indicative of the position of the output shaft. In communication with the controller is a diode that is configured to output a signal indicating the temperature of the magnet and the sensor. Based on the signal from the diode, the controller is configured to compensate the output of the sensor.

As to the method, the method includes the steps of rotating the output shaft to the first position, providing a first stop value at a specific temperature and recording this value, rotating output shaft to the second position, providing a second stop value at the specific temperature and recording this value, subtracting a current temperature value from the calibration temperature value to obtain a temperature difference value and compensating output of the sensor based on the temperature difference value.

Compensating the output of the sensor based on the temperature difference value includes the steps of calculating a correction factor based on the temperature difference value and either adding or subtracting the correction factor to the first and second stop values to obtain a compensated first and second stop values These and other advantages, features, and embodiments of the invention will become apparent from the drawings, detailed description, and claims, which follow.

DETAILED DESCRIPTION

Figure 1:
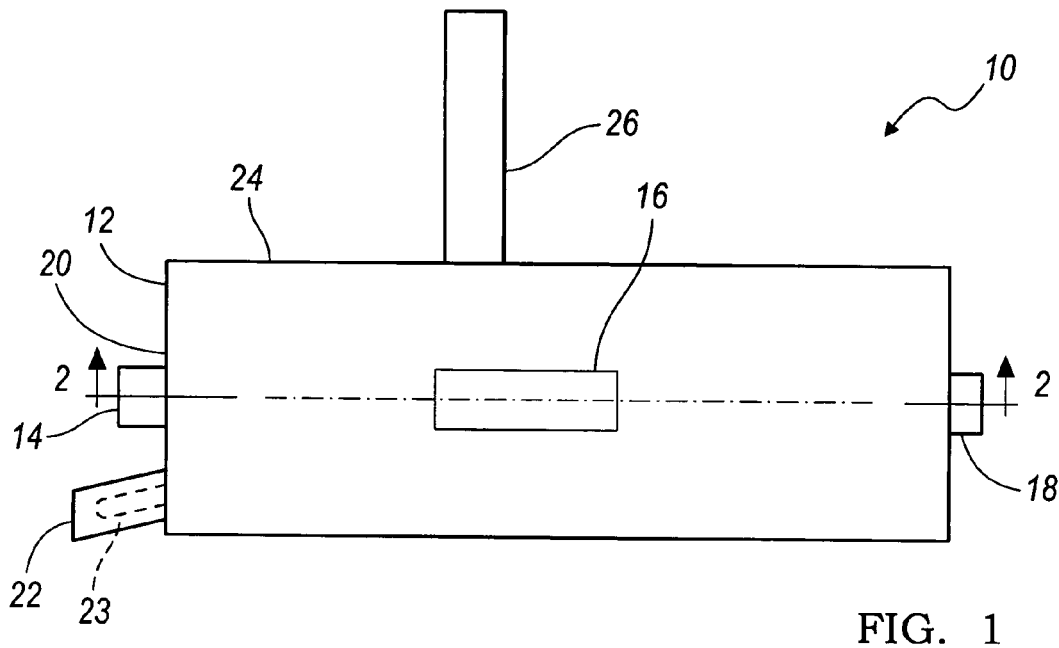
FIG. 1 is a side view of an actuator embodying the principles of the present invention.

Referring to FIG. 1, an actuator 10 is illustrated therein and includes a housing 12 having mounting points 14, 16, 18. The housing is typically made of plastic but may be made of metal. Extending from a side 20 of the housing 12 is an electrical connector 22 that allows for outside communication with the actuator 10 via a pin 23. Extending from a one side 24 of the housing 12 is an output shaft 26. Generally, the output shaft 26 is made of a metal, such as steel, but may alternatively be made of plastic.

Figure 2:
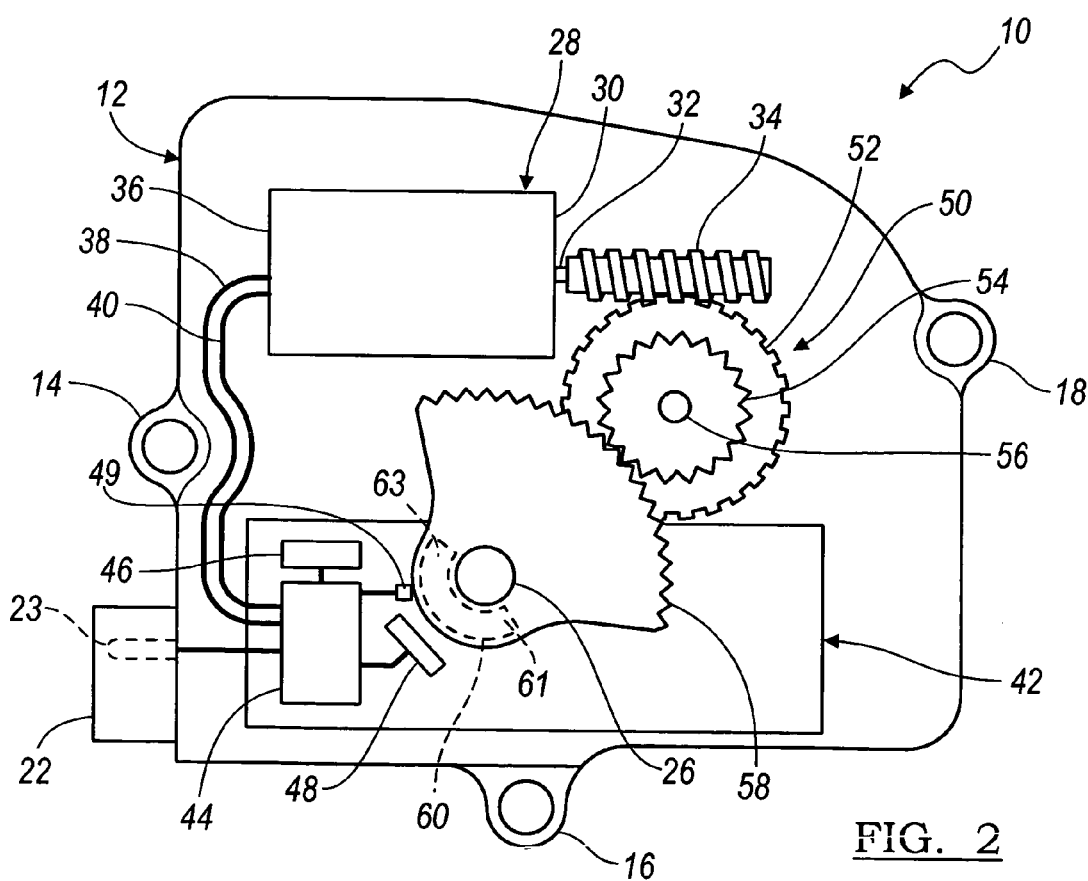
FIG. 2 is a cross-sectional view, generally taken along line 2-2, of the actuator seen in FIG. 1.

Referring now to FIG. 2, inside the housing 12 is located a motor 28, preferably an electrical motor of conventional construction. At a first end 30 of the motor 28 is an output 32 extends from one end 30 of the motor 28. Also extending from the motor 28 are motor control lines 38, 40.

In addition to the motor 28, disposed within the housing 12, is an electronic control module (ECM) 42 that is connected to the motor 28 via the control lines 38, 40. The ECM 42 includes a controller 44, a memory unit 46, and a Hall Effect sensor 48 and a diode 49. Preferably, the Hall Effect sensor 48 is an uncompensated Hall Effect Sensor. Generally, the memory unit is a non-volatile memory unit in electrical communication with the controller 44. Alternatively, the controller 44 may contain an integrated memory unit, thus relinquishing the need of the memory unit 46.

The output 32 of the motor 28 is coupled to the output shaft 26 of the actuator 10 by way of a gear train 50. The gear train 50 includes a worm gear 34, a first sprocket 52, and a second sprocket 54. Generally, the first and second sprockets 52, 54, are made of plastic, but may be made of an alternative material, such as steel.

The worm gear 34 is mounted on, and rotates with, the output 32 of the motor 28. The worm gear 34 mechanically engages a first sprocket 52 and will rotate the sprocket 52 around the axis 56. The first sprocket 52, first is coupled to a second sprocket 54, which is concentric therewith and will also rotate around the axis 56.

The teeth on the second sprocket 54 engage corresponding teeth on a shaft sprocket or bell gear 58, which is in turn connected to the output shaft 26 of the actuator 10 so as to rotate therewith. Thus, when the second sprocket 54 is caused to rotate, the shaft sprocket 58 will rotate causing the output shaft 26 to correspondingly rotate.

Also coupled to the shaft sprocket 58 is a magnet 60. The Hall Effect sensor 48 is located proximate to the magnet 60 so that the magnetic field created by the magnet 60 can be detected by the Hall Effect sensor 48. With regard to the magnet 60, the magnet 60 is oriented such that during rotation of the shaft sprocket 58 the magnet's poles 61, 63 are caused to move relative to the Hall Effect sensor 48. The diode 49 is also placed proximate to both the magnet 60 and the Hall Effect sensor 48. The diode 49 is sensitive to temperature and will produce a voltage signal indicative of the temperature in the surrounding area, including the area near the Hall Effect sensor 48 and the magnet 60. The magnet 60 may be a neodymium iron boron (NeFeB) magnet but may be a Samarian cobalt (SmCo) magnet.

During operation of the actuator 10, the controller 44 continuously monitors the pin 23 of the electrical connector 22 for a calibration signal. Since the pin 23 of the electrical connector 22 may be used for other purposes, such as for receiving a signal for instructing the actuator 10 to rotate the output shaft 26, the calibration signal must be unique enough for the controller 44 to differentiate it from other signals.

One of many possible constructs for the calibration signal is a 1 kHz signal for 250 ms followed by a 2 kHz for 250 ms. The only requirement for this signal is that the calibration signal be unique enough for the controller 44 to differentiate it from other signals.

Once the controller 44 has determined that the pin 23 of the electrical connector 22 has received the calibration signal, the controller 44 will place the actuator 10 in a calibration mode and output an acknowledgment signal, such as a 10% duty cycle signal, through the pin 23 of the electrical connector 22. Alternatively, the acknowledgment signal, may vary from the example. The only requirement for the acknowledgment signal being that acknowledgment signal is unique enough for an outside device (connected to the pin 23 of the electrical connector 22) to be able to differentiate the acknowledgment signal from other signals.

After the actuator 10 has been placed into the calibration mode, the actuator 10 follows an initial calibration technique method relating to calibrating the output of the Hall Effect sensor 48 after final assembly of the actuator 10.

First, the initial calibration technique requires that the output shaft 26 be rotated to a first position. This may be accomplished by an external force or by the motor 28. If the motor 28 is used to rotate the output shaft 26 to the first position, the controller 44 will instruct the motor 28 to rotate the output shaft 26 in a first direction.

In order to determine if the output of the shaft 26 has reached the first position, the controller 44 will monitor the output of the Hall Effect sensor 48 to determine if the output of the Hall Effect sensor 48 is changing. A first hard physical stop (not shown) will be used to prevent the shaft 26 from rotating beyond the first position. When the output of the Hall Effect sensor 48 is no longer changing over a period of time, the controller 44 will determine that the output shaft 26 has reached the first hard stop and therefore, the first position. The controller 44 will then instruct the motor 28 to stop rotating the output shaft 26 in the first direction. Afterward, the controller 44 takes a reading from the Hall Effect sensor 38 and stores the reading in the memory unit 46 as a first stop value.

Next, the output shaft 26 is then moved to a second position. Similarly as described above, this may be accomplished by an external force or by the motor 28. If the motor 28 is used to rotate the output shaft 26 to the second position, the controller 44 will instruct the motor 28 to rotate the output shaft in a second direction.

In order to determine if the output shaft 26 has reached the second position, the controller 44 will monitor the output of the Hall Effect sensor 48 to determine if the output of the Hall Effect sensor 48 is changing. A second hard physical stop (not shown) will be used to prevent the shaft 26 from rotating beyond the second position. When the output of the Hall Effect sensor 48 is no longer changing, the output shaft 26 has reached the second hard physical stop and therefore, the second position. The controller 44 will then instruct the motor 28 to stop rotating the output shaft 26 in the second direction. Afterward, the controller 44 takes a reading from the Hall Effect sensor 48 and stores the reading in the memory unit 46 as a second stop value.

When in operation, the output shaft 26 will be required to rotate to either the first position or the second position. Using the previously stored first and second stop values, the controller 44 will be able to determine when the output shaft 26 has reached either the first position or the second position. This is accomplished by having the controller 44 monitor the output of the Hall Effect sensor 48 and compare the output of the Hall Effect sensor 48 to the first and second stop values. When the output of the Hall Effect sensor 48 approximately matches the first or second stop values, the controller will determine that the output shaft 26 has reached either the first position or the second position and instruct the motor 28 to stop rotating the output shaft 26.

After the initial calibration technique is complete, a temperature compensation technique commences. The temperature compensation technique relates to the calibrating the actuator 10 is adjusting the output of the Hall Effect sensor 48 for changes in the temperature in the magnet 60 and the Hall Effect sensor 48. Similar to the previously described method, the output shaft 26 is moved to the first position and the second position by either and external force or the motor 28. Likewise, the first stop value and second stop value is stored in the memory unit 46.

Additionally, a reading from a diode 49 will be stored in the memory unit 46 as a calibration temperature value. The calibration temperature value is representative of the temperature near the magnet 60 and the Hall Effect sensor 48 and is usually a specific temperature, such as 25° C.

When in operation, the output of the Hall Effect sensor 48 will vary as the temperature of the Hall Effect sensor 48 and the magnet 60 change. The output of the diode 48, being near the Hall Effect sensor 48 and the magnet 60, will change in accordance to the change in temperature to the Hall Effect sensor 48 and the magnet 60.

During operation, the output of the diode 49 will be monitored and converted to a current temperature value. The current temperature value is then subtracted from the calibration temperature value to obtain a temperature difference value. Using the temperature difference value, the controller will calculate a correction factor. The correction factor may be calculated by using empirical data stored in the memory unit 46. The correction factor will then be subtracted from the first position indicator and added to the second position indicator to obtain a compensated first stop value and a compensated second stop value.

In operation, the output shaft 26 will be required to rotate to either the first position or the second position. Using the previously calculated compensated first and second stop values, the controller 44 will be able to determine when the output shaft 26 has reached either the first position or the second position. This is done by having the controller 44 monitor the output of the Hall Effect sensor 48 and compare the output of the Hall Effect sensor 48 to the compensated first and second stop values. When the output of the Hall Effect sensor 48 approximately matches the compensated first or second stop values, the controller will determine that the output shaft 26 has reached either the first position or the second position and instruct the motor 28 to stop rotating the output shaft 26.

The foregoing description of the embodiment of the invention has been presented for purposes of illustration and description. It is not intended to be exhaustive or to limit the invention to the precise embodiment disclosed. Numerous modifications or variations are possible in light of the above teaching. The embodiment discussed was chosen and described to provide the best illustration of the principles of the invention in its practical application to thereby enable one of ordinary skill in the art to utilize the invention in various embodiments and with various modifications as are suited to the particulate use contemplated. All such modifications and variations are within the scope of the invention as determined by the appended claims when interpreted in accordance with the breadth to which they are fairly, legally, and equitably entitled.

The invention claimed is:

1. An actuator comprising:
   an output shaft;
   a motor coupled to the output shaft and adapted to rotate the output shaft;
   a magnet mounted so as to be rotatable with the output shaft, the magnet producing a magnetic field;
   a controller in communication with a sensor, the sensor being located so as to perceive the magnetic field produced by the magnet;
   a diode located in proximity to the sensor, the diode being configured to output a temperature signal corresponding to temperature of the sensor, whereby the controller is further configured to compensate a signal received from the sensor based on the temperature signal received from the diode.

2. The actuator of claim 1, wherein the sensor is a Hall Effect sensor.

3. The actuator of claim 1, wherein the Hall Effect sensor is an uncompensated Hall Effect sensor.

4. The actuator of claim 1, wherein the magnet is a neodymium iron boron magnet.

5. The actuator of claim 1, wherein the electronic control module further comprises a memory unit in communication with the controller.

6. The actuator of claim 5, wherein the memory unit is a non-volatile memory unit.

7. The actuator of claim 1, further comprising a motor in communication with the controller, the motor coupled to the output shaft so as to be rotated thereby.

8. The actuator of claim 7, further comprising a gear train in mechanical communication between the motor and the output shaft.

* * * * *